Figure 1:
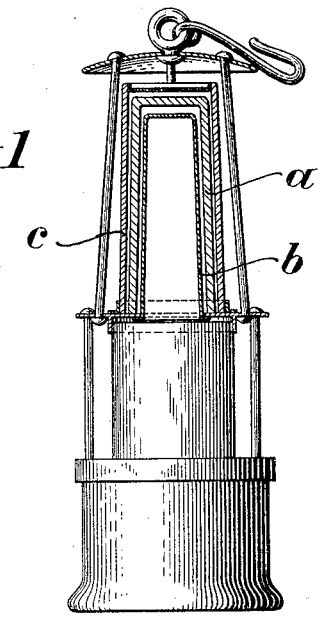

F. FATTINGER.
PYROPHORIC IGNITION MINER'S SAFETY LAMP.
APPLICATION FILED DEC. 16, 1911.

1,109,055.

Patented Sept. 1, 1914.

Witnesses:-

Inventor
Franz Fattinger
his Attorney

UNITED STATES PATENT OFFICE.

FRANZ FATTINGER, OF TREIBACH, CARINTHIA, AUSTRIA-HUNGARY, ASSIGNOR TO TREIBACHER CHEMISCHE WERKE GESELLSCHAFT M. B. H., OF TREIBACH, AUSTRIA-HUNGARY, A CORPORATION OF AUSTRIA.

PYROPHORIC-IGNITION MINER'S SAFETY-LAMP.

1,109,055.      Specification of Letters Patent.      Patented Sept. 1, 1914.

Application filed December 16, 1911. Serial No. 666,144.

*To all whom it may concern:*

Be it known that I, Dr. FRANZ FATTINGER, a subject of the Emperor of Austria-Hungary, residing at Treibach, Carinthia, Austria-Hungary, have invented certain new and useful Improvements in Pyrophoric-Ignition Miners' Safety-Lamps, of which the following is a specification.

This invention relates to miners' safety lamps and more particularly to miners' safety lamps equipped with ignition means comprising a piece of pyrophoric alloy and means for abrading the same. A safety lamp of this type is illustrated and described in German patent No. 221295 granted Ferdinand Arthur Wicke and dated October 30, 1908.

An object of this invention is to provide a safety lamp of the character just referred to with means for preventing the escape of the pyrophoric unburnt dust or particles into the outer air or atmosphere of the mine.

Numerous efforts have heretofore been made to provide means for guarding against explosion of miners' lamps, but so far I am aware none of these attempts has been entirely successful.

I have now discovered that complete safety against explosion can be attained by arranging a filtering device between the lamp flame and the atmosphere, which will allow atmospheric air and the combustion gases to pass through it readily, but will not allow dust or minute particles of solid substances to pass through. By this means complete safety against explosion is secured without appreciably affecting the entrance of the air for combustion and the exit of the combustion gases.

The present invention now consists substantially in providing a miners' safety lamp with a dust filter between the lamp flame and the atmosphere. Said filter may be composed of any suitable substance being sufficiently refractory to heat in the form of a screen of small bodies, wires, filaments or the like, for instance, sand, glass beads, glass wool, metal wool, asbestos filaments, and the like, connected together or formed in one piece as by molding.

In a lamp having a plurality of gauze protectors, the aforesaid dust filter is arranged between two of the said protectors.

In a lamp having only one gauze protector, the dust filter is arranged inside it over or against the air inlet holes.

Where the filter is made of a good heat conducting material, for instance of a loose fabric of metal wool, the usual wire gauze protector may be dispensed with entirely, because in such a case, the dust filter has also the safety action of a wire gauze protector.

In some constructions of lamps the dust filter need not be arranged over or against the air inlet holes.

For filtering the combustion gases the filter has the form of a sleeve, cap casing or basket.

When the filter has become thickly laden with dust after long use, it should be cleaned, for instance, by blowing hot air through it.

Filamentous material, for instance, glass wool, is employed in the condition of a very loose woven or felted fabric in the formation of the dust filter.

When the sand-like material is employed for the dust filter, the said material is poured in the shape of a sleeve, cap or casing, between two gratings or perforated walls, for instance between two thicknesses of wire gauze.

If convenient the usual gauze protector or protectors may be used as a wall or walls for this purpose.

Figure 2:
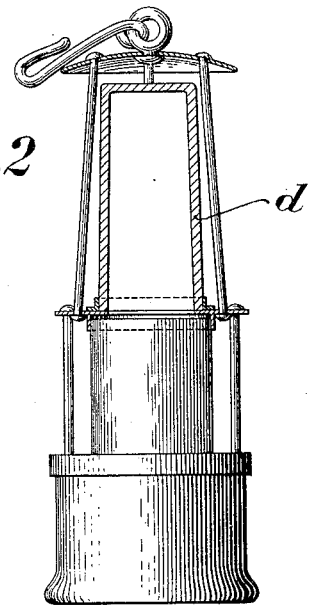

In the accompanying drawings:—Figure 1 is an elevation partly in section of one form of the invention, and Fig. 2 is a similar view of a modified form of the invention.

In the form shown in Fig. 1, *a* is the dust filter arranged between the two wire gauze protectors *b* and *c*.

In the modification shown in Fig. 2, *d* is a dust filter composed of metal-wool or the like. In this last modification the dust filter *d* also fulfils the function of the wire gauze protector otherwise usually employed.

What I claim is:—

1. A pyrophoric-ignition miners' safety lamp having a filter adapted and designed to intercept and retain unburnt particles of pyrophoric alloy and prevent such particles from gaining access to the mine atmosphere, while permitting free access of the same to the space within the filter and free flow of the gaseous products of combustion therethrough.

2. A pyrophoric-ignition miners' safety lamp having an inverted cup-shaped filter adapted and designed to intercept and retain unburnt particles of pyrophoric alloy and prevent such particles from gaining access to the mine atmosphere, while permitting free access of the same to the space within the filter and free flow of the gaseous products of combustion therethrough.

3. A pyrophoric-ignition miners' safety lamp having a heat-conducting filter adapted and designed to intercept and retain unburnt particles of pyrophoric alloy and prevent such particles from gaining access to the mine atmosphere, while permitting free access of the same to the space within the filter and free flow of the gaseous products of combustion therethrough.

4. A pyrophoric-ignition miners' safety lamp having a heat-conducting screen and a filter adapted and designed to intercept and retain unburnt particles of pyrophoric alloy and prevent such particles from gaining access to the mine atmosphere, while permitting free access of the same to the space within the filter and free flow of the gaseous products of combustion therethrough.

In testimony whereof I affix my signature in presence of two witnesses.

Dr. FRANZ FATTINGER.

Witnesses:
ANDREAS FORSTER,
OMY VICTOR LERZ.

---

Copies of this patent may be obtained for five cents each, by addressing the "Commissioner of Patents, Washington, D. C."